US007002457B2

(12) United States Patent
Stevenson et al.

(10) Patent No.: US 7,002,457 B2
(45) Date of Patent: Feb. 21, 2006

(54) SEAT BELT STATUS MONITORING SYSTEM

(75) Inventors: Robin Stevenson, Bloomfield, MI (US); Clark E McCall, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 296 days.

(21) Appl. No.: 10/325,217

(22) Filed: Dec. 20, 2002

(65) Prior Publication Data

US 2004/0119599 A1 Jun. 24, 2004

(51) Int. Cl.
*B60Q 1/00* (2006.01)

(52) U.S. Cl. .............................. 340/457.1; 340/686.4; 200/61.58 B; 280/801.1; 180/286; 24/633

(58) Field of Classification Search ............. 340/457.1, 340/539.1, 665, 687, 686.4, 693.1; 24/163 R
See application file for complete search history.

(56) References Cited

U.S. PATENT DOCUMENTS 3,833,781 A * 9/1974 Rumpf ................ 200/61.58 B
4,163,128 A * 7/1979 Miskowicz .......... 200/61.58 B
5,149,189 A * 9/1992 Kawamura .................. 362/108
5,182,836 A * 2/1993 Burkat ........................ 24/633
5,406,252 A 4/1995 Dear ....................... 340/457.1
5,627,512 A 5/1997 Bogar ..................... 340/457.1
5,752,299 A * 5/1998 Vivacqua et al. ............. 24/633
6,002,325 A 12/1999 Conaway ................. 340/384.1
6,259,042 B1 * 7/2001 David ........................ 177/136
6,264,236 B1 * 7/2001 Aoki .......................... 280/735
6,382,667 B1 * 5/2002 Aoki .......................... 280/735
6,578,432 B1 * 6/2003 Blakesley et al. ............ 73/826
6,700,310 B1 * 3/2004 Maue et al. ................ 310/339
2002/0180200 A1 * 12/2002 Tokugawa ............... 280/801.1

FOREIGN PATENT DOCUMENTS

JP 2001-000211 A * 1/2001

* cited by examiner

*Primary Examiner*—Benjamin C. Lee
(74) *Attorney, Agent, or Firm*—Kathryn A. Marra

(57) ABSTRACT

A seat belt status monitoring system for use with one or more seat belts of an automotive vehicle. The system includes a status monitor incorporated into the seat belt buckle and has a receiver and operator signaling device located in the instrument panel. The status monitor utilizes a piezoelectric element to generate an electrical signal that is fed to a transmitter to generate a wireless signal from the buckle. A mechanical sensing member is used to activate the piezoelectric element to generate its electrical signal by imparting a mechanical force on the piezoelectric during insertion and removal of the seat belt tongue from the buckle. A microswitch in the buckle is used by the transmitter to determine whether the seat belt is latched or unlatched, and this information is conveyed by the transmitted wireless signal. The wireless signal uniquely identifies the particular seat belt buckle from which it is transmitted so that the receiver can keep track of the status of each of a number of different seat belt buckles within the vehicle.

39 Claims, 2 Drawing Sheets

32
36
88
46
10
1A
1A
26
36
30
14
88
38
12
18
34
16
40
22
20
32
24

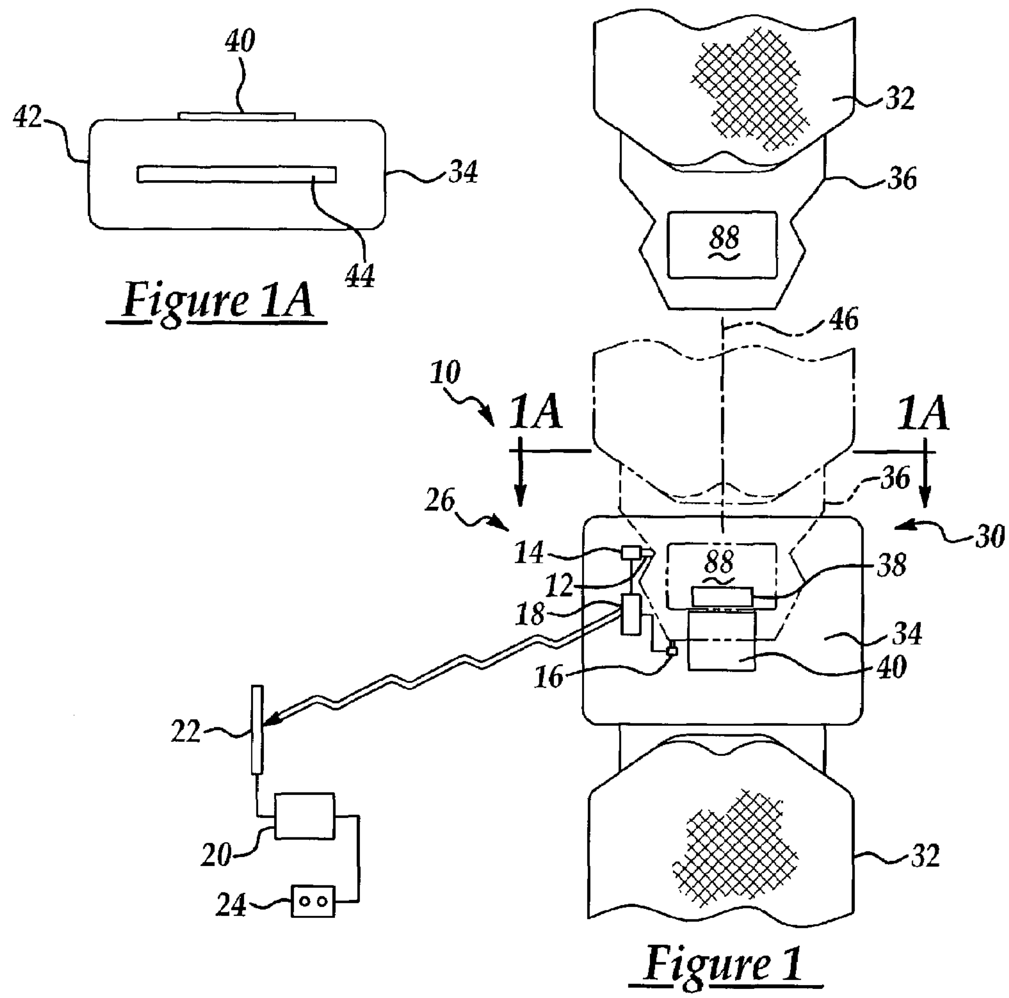
Figure 1A
Figure 1
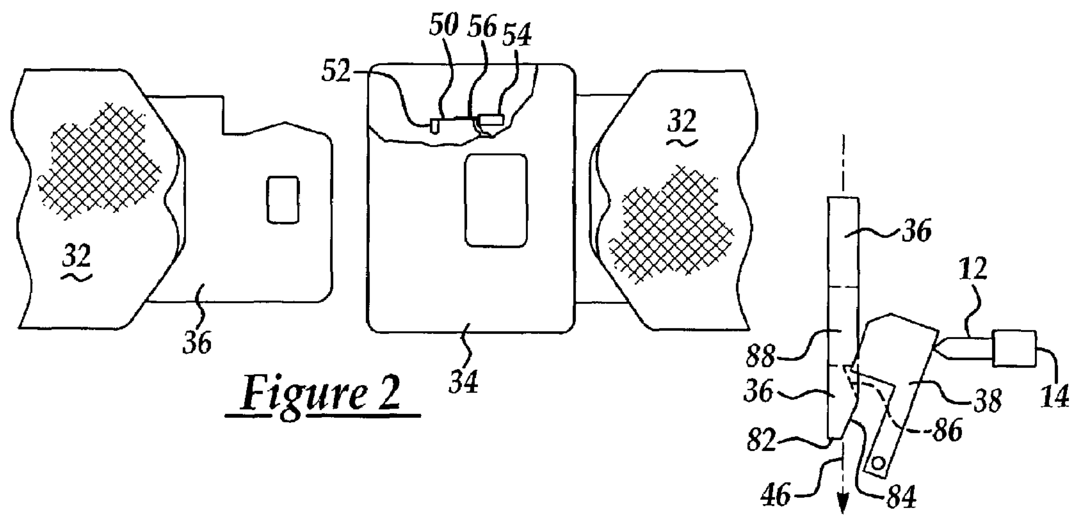
Figure 2
Figure 3

SEAT BELT STATUS MONITORING SYSTEM

TECHNICAL FIELD

The present invention relates to electronic seat belt status monitoring systems of the types used on vehicles to determine whether a seat belt is in a latched or unlatched state.

BACKGROUND OF THE INVENTION

Many automotive passenger vehicles come equipped with a driver's seat belt monitoring system that determines whether the driver's seat belt is latched or unlatched each time the vehicle ignition is turned on. Where the system determines that the driver's belt is not latched, an audible and/or visual reminder warning is provided to alert the driver of this condition. These systems can be provided for other occupant seats within the vehicle, although this is not currently done on a widespread basis. Rather, where a driver wishes to determine whether the seat belt of another occupant seat is latched or unlatched, the more typical method is either visual inspection, usually from the driver's seat, or querying of an occupant. Visual inspection from the driver's seat can be difficult, and querying children as to the status of their seat belt can be unreliable.

The monitoring systems commonly used today are electronically-implemented systems that may include circuitry at the driver's seat belt buckle which is hardwired to an operator signaling device at the instrument panel to produce the audible and/or visual warning. Using a hardwired system for other occupant seats can be problematic, especially when used on vans and the like that include removable seats. Independent status monitoring systems that do not require wiring between the instrument panel and seat have been proposed as well, and at least some of these systems use a battery-powered circuit to produce an audible alert at the seat belt buckle itself.

SUMMARY OF THE INVENTION

In accordance with one aspect of the present invention, there is provided a seat belt status monitor for use with a vehicle seat belt assembly having a seat belt buckle and tongue that can be inserted and removed from the seat belt buckle. The status monitor includes a mechanical sensing member located within a seat belt buckle such that it is movable within the seat belt buckle during insertion of the seat belt tongue. A piezoelectric element is positioned relative to the mechanical sensing member such that its movement imparts a mechanical force onto the piezoelectric that results in an electrical signal being produced by the piezoelectric. The monitor also includes a transmitter located within the buckle that receives the electrical signal and emits a wireless signal in response thereto. Preferably, the electrical signal produced by the piezoelectric is used not only to signal the transmitter, but also provides the electrical energy needed to operate the transmitter. The wireless signal can be generated in a variety of different ways, such as, for example, through the use of a spark gap or a tuned resonant circuit, and this wireless signal can be used to provide status information concerning the seat belt. An encoding circuit can also be used, if desired, to include encoded status information in the transmitted signal. The status information provided by the transmitted signal provides data concerning latching of the tongue into the seat belt buckle and this status information can include data concerning a change in status (an unlatched-to-latched transition or a latched-to-unlatched transition) of the seat belt and/or data concerning the latch condition (i.e., the static state, latched or unlatched) of the seat belt.

In accordance with another aspect of the invention, a seat belt status monitor such as the one summarized above can be provided as a part of an overall seat belt status monitoring system used to provide an alert signal to the vehicle driver. In addition to the status monitor in the seat belt buckle, the system further includes a receiver that detects the wireless signal sent from the transmitter and an operator signaling device connected to the receiver to provide an alert to the driver based on the received wireless signal.

The seat belt status monitoring system can be used for monitoring the status of a plurality of vehicle seat belt assemblies within the vehicle, in which case it includes a plurality of status monitors, each of which is associated with a different one of the vehicle seat belt assemblies. Each of the status monitors includes a dedicated or shared power source, a mechanical sensing member, and a transmitter, with the mechanical sensing members each being movable during latching and unlatching of its associated seat belt assembly. The transmitters are each operable in response to movement of its associated mechanical sensing member to utilize electricity from the power source to emit a wireless signal uniquely identifying its associated seat belt assembly from the one or more other seat belt assemblies. The monitoring system further includes a receiver capable of detecting the wireless signal and determining which of the seat belt assemblies is associated with the received wireless signal. Preferably, the power source is a piezoelectric element that is activated by a mechanical force imparted by the mechanical sensing member when it moves during latching and unlatching of the seat belt assembly. Each of the seat belt assemblies can be uniquely identified from each other in any of a number of different ways, such as by assigning a unique frequency to each of the transmitted wireless signals, or by encoding a unique identifier in the wireless signal.

In accordance with yet another aspect of the present invention, there is provided a seat belt buckle that includes a housing having an opening for receiving a seat belt tongue and including a status monitor located within the housing. The status monitor has a transmitter and a displaceable component positioned within the housing such that the displaceable component provides a mechanical input to the transmitter during insertion of the tongue into the opening. The transmitter then generates a wireless seat belt status signal as a result of this input. The displaceable component can be, for example, a mechanical sensing member as noted above, or can be a sliding element that activates the mechanical sensing member. Other implementations of the displaceable component can be used as well.

The seat belt tongue can be a planar member that, in one aspect of the invention, includes a longitudinal side edge having first and second angled surfaces that extend at least partially between a front, leading edge and a rear edge where the tongue is connected to a set belt strap. The angled surfaces on this longitudinal edge can be used to activate a status monitor incorporated into the seat belt buckle. For example, the angled surfaces can be used as cams which contact a plunger or other mechanical sensing member that provides a mechanical input for the status monitor.

BRIEF DESCRIPTION OF THE DRAWINGS

Preferred exemplary embodiments of the invention will hereinafter be described in conjunction with the appended drawings, wherein like designations denote like elements, and wherein:

FIG. 1 shows a first embodiment of a seat belt status monitoring system of the present invention;

FIG. 1A is taken along the A—A line of FIG. 1 and depicts a front view of the seat belt buckle of FIG. 1;

FIG. 2 shows the seat belt portion of a second embodiment of a seat belt status monitoring system of the present invention, with this embodiment using a flexible arm in contact with a side surface of a seat belt tongue;

FIG. 3 shows portions of a third embodiment of a seat belt status monitoring system of the present invention, with this embodiment utilizing a plunger that contacts a top surface of a retention latch;

DETAILED DESCRIPTION OF THE PREFERRED EMBODIMENTS

Figure 4:
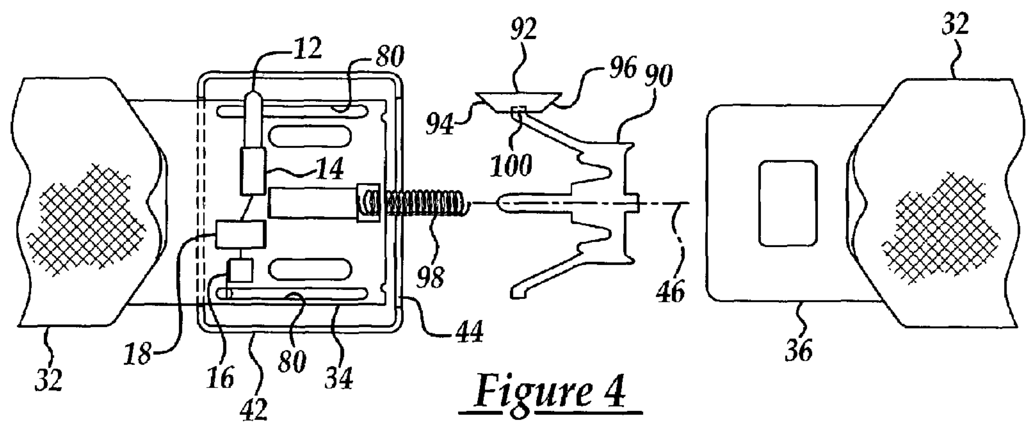
FIG. 4 shows the seat belt portion of a fourth embodiment of the seat belt status monitoring system of the present invention, with this embodiment utilizing a plunger that contacts a sliding element that is an internal component of the buckle.

FIG. 1 depicts a seat belt status monitoring system 10 that monitors the status of a seat belt assembly and utilizes a piezoelectric element for the transmission of a wireless signal representative of that status. As used herein, "status" means data concerning a changing condition of the seat belt (an unlatched-to-latched transition or a latched-to-unlatched transition) and/or data concerning the latch condition of the seat belt. The "latch condition" refers to the static state, latched or unlatched, of the seat belt. System 10 generally includes a mechanical sensing member 12, a piezoelectric element 14, a microswitch 16, a transmitter 18, a receiver 20 including an antenna 22, and an operator signaling device 24. Generally speaking, the mechanical sensing member 12 produces a mechanical output in response to the position of a moving component such as a seat belt tongue 36. In the particular embodiment illustrated in FIG. 1, this mechanical output is the result of the mechanical sensing member 12 moving during insertion and removal of the seat belt tongue 36. The piezoelectric element 14 is positioned such that a mechanical output of the sensing element 12 imparts a mechanical force on the piezoelectric, causing it to produce an electrical signal which is sent to the transmitter 18. This electrical signal is used by the transmitter both as a signal of status information concerning seat belt latching and as the electrical energy needed by the transmitter to send a wireless seat belt status signal to the receiver 20. This obviates the need for a separate energy source such as batteries. The microswitch 16 is used by the transmitter 18 to determine the latch condition of the seat belt assembly and this information is included in the wireless signal sent to the receiver 20. Antenna 22 receives the wireless signal and passes it along to the receiver unit 20 for processing. Following various signal processing steps, the receiver sends an alert signal to the operator display 24, which informs the driver of the status of the seat belt assembly. The mechanical sensing member 12, piezoelectric element 14, microswitch 16, and transmitter 18 together comprise a seat belt status monitor 26, and all of these components are enclosed within the seat belt buckle 34. As will be discussed in greater detail further below, the receiver 20 may receive and process wireless signals from numerous seat belt monitors, thereby acting as a central monitor of the status of several or all of the seat belt assemblies within the vehicle.

The seat belt assembly 30 generally includes a belt portion 32, the buckle portion 34 that is securely fastened to one end of the belt portion, and a tongue portion 36 that is securely fastened to another end of the belt portion. The tongue 36 is designed to be inserted into a narrow slot in the buckle such that once it is inserted, a retention latch 38 locks the tongue in place and firmly secures the two components together. A release button 40 is coupled to the retention latch such that depression of the release button allows the tongue to separate from the buckle. The particular seat belt assembly configurations shown in the figures have been provided as examples of the types of seat belt assemblies that may be used with the monitor of the present invention, and it will be understood that the seat belt strap portions 32 and the buckle housing, retention latch, release button, and other internal latching components of the buckle 34 can be constructed according to any one of a number of known designs.

As noted above, the seat belt status monitor 26 is capable of determining the status of seat belt assembly 30 during latching and unlatching of the seat belt, and uses the mechanical sensing member 12, piezoelectric element 14, and transmitter 18 to send a wireless signal representative of that status without requiring electrical connections to the vehicle or a replaceable energy source. The mechanical sensing member shown here is a plunger, however, other forms such as a flexible arm could be used. The plunger 12 is a generally cylindrical component that includes an outer axial end for contacting a side edge of tongue 36, and an inner axial end operably coupled to the piezoelectric element. Depression of the plunger 12 causes a mechanical force to be exerted upon the piezoelectric element 14. As is well known, piezoelectric elements, such as quartz or certain ceramics, are capable of generating an electric potential in response to a mechanical deformation (such as, in particular, compression of the piezoelectric). This electric potential is collected by electrodes on the piezoelectric in a known manner and is provided as an electrical signal which is then sent to transmitter 18. Microswitch 16 is a two-state momentary switch, such as a limit switch, having normally open contacts. Thus, when the tongue 36 is unlatched and separated from the buckle 34, the switch is open. When the tongue is fully inserted into the buckle in its latched position, the leading (front) edge of the tongue engages the switch, closing it. These states of switch 16 can be read by the transmitter, again using energy derived from the piezoelectric. Thus, in operation, transmitter 18 receives the electrical signal from the piezoelectric element 14, reads the state of microswitch 16, and then emits a wireless signal indicating the latch condition of the seat belt.

Piezoelectric element 14 is shown diagrammatically throughout the figures, and it will be understood by those skilled in the art that the piezoelectric element 14 could be provided as a multi-component part that includes a piezoelectric material together with a housing and actuating member that receives the mechanical input from the mechanical sensing member 12 and transmits the mechanical force to the piezoelectric once a certain, minimally sufficient force is applied. Such devices are known wherein an increasing force on the device produces little or no change in the device voltage output until the force passes a threshold at which the device snaps the piezoelectric material, thereby creating a single, high voltage pulse. This pulse constitutes the electrical signal delivered to the transmitter.

The plunger 12, piezoelectric element 14, microswitch 16, and transmitter 18 are all housed within the buckle 34. More specifically, as shown in FIG. 1A, buckle 34 includes a housing 42 having an opening 44 in a front side of the housing. The opening 44 is sized to receive the tongue 36 which can be inserted and removed from the housing along an insertion axis 46 shown in FIG. 1. The piezoelectric 14 and microswitch 16 are secured within the housing 42 at locations that properly cooperate with the edges of tongue 36 when it is inserted. In particular, the plunger 12 is located laterally of the insertion axis so that it contacts and is displaced by a longitudinal edge of the tongue 36 during insertion and removal of the tongue. The microswitch 16 is located near the end of travel of the tongue so that its front edge contacts and closes the microswitch just as it reaches its fully inserted position. The transmitter 18 is placed at a location within the housing 42 out of the way of the remaining components.

With reference to FIG. 2, a second embodiment involving the mechanical sensing member is shown, and it will be understood that, in connection with this and the other embodiments disclosed, an overall monitoring system can include the other elements shown in FIG. 1 such as the microswitch 16, transmitter 18, receiver 20, antenna 22, and operator signaling device 24. According to this embodiment, the mechanical sensing member comprises a flexible arm 50 having a head portion 52, a base portion 54, and a piezoelectric coating or layer 56. The head portion 52 is resiliently located at one end of the flexible arm 50, while the stationary base portion 54 is located at the other. As tongue 36 is inserted into the buckle 34, a side edge of the tongue 36 contacts the head portion 52, causing it to flex outwardly away from the center of the buckle 34. Because the piezoelectric is attached to the flexible arm, bending of the arm imparts a mechanical force on the piezoelectric. In turn, this mechanical force causes the piezoelectric to generate an electrical signal. As previously discussed, the piezoelectric element is connected to the transmitter 18 so that the electrical signal generated by flexing of the arm is supplied to the transmitter for use in generating the wireless seat belt status signal.

FIG. 3 shows a third embodiment involving the mechanical sensing member 12. According to this embodiment, mechanical sensing member 12 is actuated by the retention latch 38 instead of a side edge of the seat belt tongue 36. In this particular embodiment, the retention latch is pivotally mounted within the seat belt buckle 34 and is used to latch the tongue in place within the buckle. As the tongue is initially inserted into the buckle along the insertion axis 46, a front surface 82 of the tongue first contacts the latch. Further movement in this direction causes the latch to ride up angled surface 84, thereby depressing plunger 12 and causing piezoelectric element 14 to send an electrical signal. The plunger remains depressed until the latch 38 begins to ride down a second angled surface 86, during which time the plunger moves away from piezoelectric element 14, thus allowing it to return to a relaxed state. Once the tongue is fully inserted, the latch 38 pivots into a cutout 88 in the tongue 36, firmly locking it in place. A reverse sequence of steps occurs when release button 40 is engaged, thereby pivoting the retention latch out of the cutout 88 and allowing the components to separate. It will be appreciated that the use of retention latch 38 to activate the piezoelectric eliminates the need for the side angled surfaces on the tongue used in the first embodiment. Also, although the angled surfaces 84, 86 are shown, other tongue and latch designs can be used that do not utilize these ramped surfaces. In this regard, it will be understood that FIG. 3 is diagrammatic only to show the use of movement of the retention latch to activate the plunger and that the actual positioning of these components and the translation of motion from the retention latch to the plunger can be implemented in various other ways than is shown.

Referring now to FIG. 4, there is seen yet a fourth embodiment wherein the mechanical sensing member 12 is again a plunger, however, the moving component that activates the plunger is a sliding element 90, which is an internal component of the seat belt buckle 34. The sliding element 90 is thus a displaceable component that provides a mechanical input to the transmitter 18 via the plunger 12 and piezoelectric 14. In this regard, the piezoelectric 14 can be considered a part of the transmitter 18 such that the mechanical input received by the transmitter is actually the movement of the plunger 12 which places a compressive strain on the piezoelectric to generate its energizing pulse. An actuating member 92 is rigidly attached to one of two lateral arms of the sliding element 90, and this actuating member includes first and second angled surfaces 94, 96 that are used to displace the plunger 12. The view of FIG. 4 shows the seat belt buckle 34 in a partially exploded form and with only the lower portion of its housing 42. Once assembled, the sliding element would remain fully within the housing. The two lateral arms of the sliding element 90 each fit into one of two internal slots 80 of the buckle that extend in the direction of axis 46. This allows the sliding element to slide back and forth between the front and rear ends of the buckle. A spring 98 is also located within the buckle and biases the sliding element 90 towards the opening 44 away from plunger 12. When the tongue 36 is inserted into buckle 34, the front edge of the tongue engages the sliding element 90, forcing it to slide toward the rear of the buckle against the force of the spring 98. As the sliding element nears the rear of the buckle, the first angled surface 94 contacts the outer tip of the plunger 12, thus causing the plunger to be depressed laterally towards the piezoelectric element 14. Additional movement of the tongue, and hence the sliding element 90, into the buckle causes the outer end of the plunger to slide along a flat surface 100, until that outer end contacts and slides down the second angled surface 96. Once the tongue is fully inserted into the buckle, the plunger will have slid down the second angled surface 96 and will again be at an extended position, thereby reseting the device. This return movement of the plunger 12 can be achieved using, for example, a spring (not shown) to bias the plunger outwardly away from the piezoelectric element. Other means for biasing the plunger are known within the art. Removal of the tongue results in the opposite sequence of events; the outer end of the plunger will slide along the second angled surface (this time depressing the plunger instead of releasing it), the flat surface, and eventually the first angled surface until the tongue is completely removed from the buckle and the plunger is again in an extended position.

The microswitch 16 is located near the second of the two slots 80 and is actuated by the second of the two lateral arms of the sliding element 90. The microswitch is positioned longitudinally relative to the plunger 12 such that, during insertion of the tongue, the first angled surface 94 of the actuating member 92 contacts the plunger 12 and activates the piezoelectric 14 prior to switch closure. That is, the relative positions of the plunger and microswitch are selected such that, when sliding element 90 is moved rearward during insertion of the tongue, the microswitch is not activated by the sliding element until after the plunger has become fully depressed and is located at a point along the flat section 100 of the actuating member 92. Similarly, the relative positions of these components are also set so that, during removal of the tongue, the plunger contacts the second angled surface 96 and is fully depressed to activate the piezoelectric prior to the switch 16 reopening its contacts. Although the existence of the flat section 100 between the two angled surfaces 94, 96 is not necessary for this embodiment to work, it reduces the need for close manufacturing tolerances on the relative positioning of the various components and on the point of switch activation, since during both insertion and removal of the tongue, the plunger can be depressed early (well before the sliding element engages or disengages the switch) and can be held in this position by the flat section while the sliding element changes the state of the microswitch. Preferably, the plunger location along the length of the slot 80 is also selected so that the piezoelectric does not fire during insertion of the tongue until latching of the tongue in the buckle is assured.

In each of the embodiments seen in FIGS. 1–4, the seat belt status monitor utilizes a mechanical sensing member, whether that be a plunger, flexible arm, or some other element, to detect the status of the tongue whenever it is inserted or removed from the buckle. In each case, the mechanical sensing member is used to detect movement of a moving component and to utilize that movement to impart a mechanical force onto the piezoelectric for generation of the energizing signal sent to the transmitter. The moving component can be the side edge of the seat belt tongue (embodiments one and two), the top surface of the retention latch (embodiment three), or the angled surfaces of the actuating member (embodiment four), to name just a few examples. Either way, the position of the moving component is representative of the status of the seat belt assembly, that is, whether or not the seat belt is latched or unlatched. Furthermore, for the purposes of defining terms used herein, it will be appreciated that both the mechanical sensing members of FIGS. 1–4 and the moving components of FIGS. 3 and 4 are displaceable components that provide the mechanical input to the transmitter. Thus, for example, in FIG. 4, the mechanical sensing member and sliding element each constitutes a displaceable component that provides the mechanical deformation of the piezoelectric. The mechanical sensing member provides this mechanical input directly to the piezoelectric, whereas the sliding element provides this mechanical input indirectly via the mechanical sensing member. FIG. 1, on the other hand, only includes a single displaceable component carried by the buckle to provide the mechanical input; namely, the mechanical sensing member 12 that is acted upon directly by the tongue.

Figure 5:
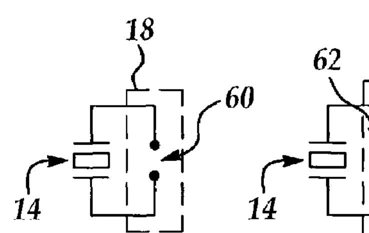
FIG. 5 shows a first embodiment of an electronic circuit that can be used as a part of a seat belt status monitor of the present invention, with this embodiment utilizing a spark gap to transmit a wireless seat belt status signal.
Figure 6:
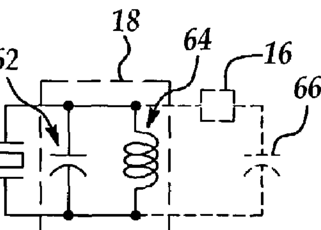
FIG. 6 shows a second embodiment of an electronic circuit that can be used as a part of a seat belt status monitor of the present invention, with this embodiment utilizing a tuned LC circuit to generate the wireless signal.
Figure 7:
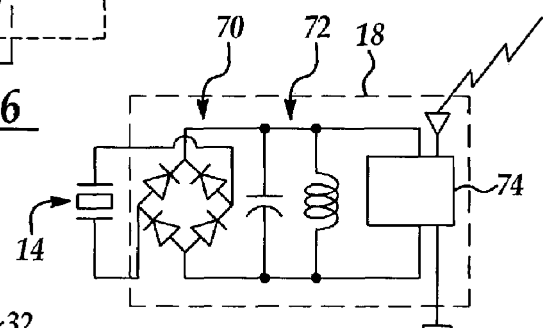
FIG. 7 shows a third embodiment of an electronic circuit that can be used as a part of a seat belt status monitor of the present invention, with this embodiment utilizing an encoding circuit.

Turning now to FIGS. 5–7, several embodiments of transmitter 18 are shown. FIG. 5 shows a transmitter generally comprising a simple spark gap 60 sized such that the electrical signal from the piezoelectric is capable of producing a spark across the spark gap 60. This circuit, including the piezoelectric 14 can be implemented using an assembly such as those commonly found in barbeque grill and/or propane torch igniters. Sparking across the gap produces a short pulse of broad bandwidth radio frequency that serves as the wireless signal, and this signal can then be picked up by antenna 22 (FIG. 1). This spark gap 60 provides one of the simplest forms of transmitter 18 and is useful where no microswitch 16 is used to provide latch condition information. Thus, the wireless signal generated by spark gap 60 provides an indication of a change in state in the seat belt (a latched-to-unlatched transistion or vice-a-versa), but does not specify which state the seat belt is in. Furthermore, this wireless signal does not enable determination of which seat belt assembly the signal came from.

The transmitter embodiment seen in FIG. 6 includes an LC circuit which emits a wireless signal at a resonant frequency that is dependent upon the values of the capacitor 62 and inductor 64. The circuit will have at least a primary frequency (i.e., the resonant frequency) even though it may provide a smaller amplitude signal at other frequencies as well. The receiver 20 can then monitor within a predetermined frequency range for this wireless signal at its primary frequency. This helps prevent false positives such as might occur with the FIG. 5 embodiment from other sources of broad bandwidth r.f. signals. This tuned circuit can also be used to uniquely identify each equipped seat belt assembly from the others by setting each tuned LC circuit to a different frequency using differing values of the capacitor 62 and/or inductor 64. Thus, for a monitoring system designed to accommodate up to eight seat belt status monitors within the vehicle, the receiver would be responsive to identify and discriminate between eight different frequencies and each of the eight seat belt assemblies would include a status monitor having a transmitter tuned to produce the wireless signal at a different one of the eight frequencies. In this way, the receiver can uniquely identify which seat belt the signal came from and can pass this information along to the operator signaling device for an appropriate display or other alert.

Where it is desirable to indicate to the receiver 20 the current state of each seat belt, rather than just the fact that the state changed, the microswitch 16 can be used in conjunction with a second capacitor 66, as shown in broken lines in FIG. 6. Where the switch 16 is open, the capacitor 66 is not involved in the circuit and the frequency is set by capacitor 62 and inductor 64. When the switch 16 is closed, the additional capacitance provided by capacitor 66 is added to the circuit, thereby altering the frequency of the transmitted wireless signal. Receiver 20 would then be constructed to monitor for these two different frequencies (both of which would be unique to the particular seat belt assembly) and would thus be able to determine the state based on the frequency of the received signal.

In the embodiment of FIG. 7, the transmitter includes a full-wave rectifier 70, an LC circuit 72, and an encoding circuit 74. The rectifier 70 and LC circuit 72 in this embodiment operate more as a power supply to the encoding circuit 74, although the LC circuit can be used to provide tuned wireless transmission, if desired. The rectified power is supplied to the encoding circuit 74 at a low voltage compatible with standard integrated circuits, and additional circuitry to provide the proper voltage levels can be included, if necessary or desirable. The encoding circuit 74 reads the state of microswitch 16 and transmits a digitally encoded signal that may include information such as a vehicle identifier (VIN), seat belt assembly identifier, the latch condition of the buckle, and diagnostic information to name but a few. Accordingly, the rectifier and LC circuit are used to provide a steady power source, while the encoding circuit produces and transmits the encoded wireless signal. Any suitable method can be utilized to encode information into the wireless signal, such as by frequency modulation or phase shift keying, and these techniques are well known in the art. Also, if desired, the circuit 74 can be used simply to generate the wireless signal at a frequency unique to that particular seat belt assembly without encoding information into the signal, and can utilize multiple frequencies to indicate the state of the switch 16, as discussed above in connection with FIG. 6. In either case, conventional transmitter circuitry can be used such as is currently utilized on key fobs for remote locking and unlocking of vehicle doors.

Referring also back to FIG. 1, receiver 20 receives the wireless signal sent by the transmitter 18 and sends an electrical signal to the operator signaling device 24 in response thereto. The antenna 22 of the receiver is located in a position on the vehicle where it can accurately receive the wireless signal being sent by each transmitter. For example, both the receiver 20 and its antenna 22 can be located behind the vehicle instrument panel. Although receiver 20 can be dedicated to the seat belt servicing function, the receiver function can alternatively be provided by an existing circuit that handles receipt of other wireless signals for other functions. For example, a receiver of the type used to handle receipt of wireless signals from a key fob can be used. Existing receivers of this type sometimes have unused channels so that they can be used in conjunction with the seat belt status monitoring system 10 without modification.

The receiver 20 can be designed according to numerous layouts known in the art, although it will be appreciated that the processing and, hence, construction of the receiver is partially dependent upon the particular transmitter used. The receiver 20 can include additional circuitry to filter, decode, run error checking functions, etc., all of which are widely known in the art. After the signal has been processed, the receiver 20 outputs an electrical signal to operator signaling device 24, which informs the operator of the current status of one or more seat belt assemblies. Where the wireless signal include latch condition information, that signaling device 24 may include an indicator light on an instrument panel, an audible warning device, or any other type of suitable display capable of conveying the latch condition to the driver. At least one indicator light can be provided for each seat with color coding to indicate the latch condition (e.g., red—unlatched, green—latched). Other suitable display approaches will become apparent to those skilled in the art.

Figure 8:
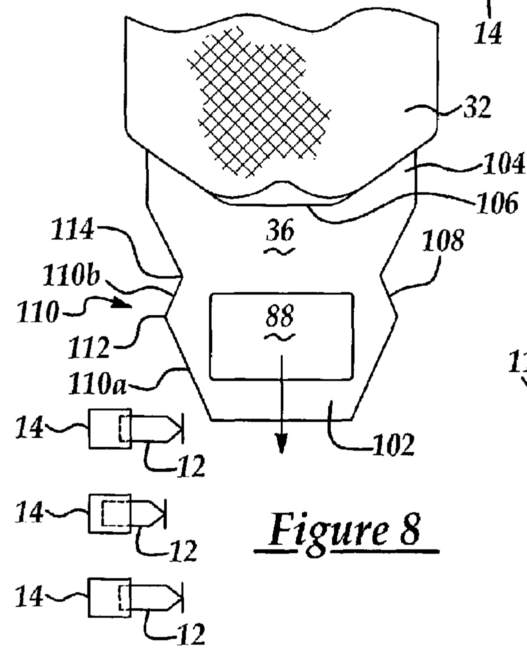
FIG. 8 shows an embodiment of a seat belt tongue such as used in the embodiment of FIG. 1, and this figure depicts the movement of the plunger element of FIG. 1 as the tongue is inserted into the buckle.

With reference to FIGS. 1 and 8, further details of the construction and use of the seat belt tongue 36 will now be described. FIG. 8 shows the position of the mechanical sensing element 12 at three different insertion positions of the seat belt tongue 36. The tongue 36 is a planar member made of, for example, plated low carbon steel. It has a front, leading end 102 near which the cutout 88 is located. It also includes a rear end 104 with an aperture 106 for connection of the tongue to a seat belt strap 32. The tongue includes first and second longitudinal edges 108, 110. Insertion of tongue 36 into the front opening 44 of seat belt buckle 34 causes a depression of mechanical sensing member 12, which in turn exerts a mechanical output against piezoelectric element 14.

According to this particular embodiment, the sensing member 12 is in the form of a plunger having a pointed or rounded tip for contacting side edge 110 of the tongue 36. The side edge 110 has multiple slopes or ramps so that, after activating the piezoelectric, the plunger 12 is able to return to its initial position. Side edge 108 has the same configuration as that of edge 110 so that the tongue is symmetrical about the insertion axis and can be inserted into opening 44 in either of the two possible orientations. The topmost view of the plunger 12 represents the plunger before it is engaged by the tongue 36, the middle view represents the plunger being engaged by a first transition point 112, and the lowermost view represents the plunger being engaged by a second transition point 114. Initially, the plunger 12 is located at a first position and is biased into this position, either by the piezoelectric element itself, or by a spring or other suitable component. As the tongue is inserted into the buckle, the first tongue surface to engage the plunger is leading slope 110*a*. As the plunger slides along the edge 110*a*, it is gradually depressed until it reaches a second position at an activation point somewhere along the length of the angled edge 110*a* where the plunger imparts a mechanical force on the piezoelectric element sufficient to cause it to generate its electrical signal. As the tongue continues its insertion into the buckle, the plunger continues past its activation point until it reaches the transition point 112 where the plunger is fully depressed. Continued insertion of the tongue 36 into the buckle causes the plunger 12 to slide down edge 110*b* such that the plunger gradually extends away from the piezoelectric element 14. The plunger 12 continues to slide upon edge 110*b* until it reaches a reset point somewhere on surface 110*b*. Once the tongue is fully inserted into the buckle, the plunger has returned to its first position at a second transition point 114 on the tongue. Returning the plunger 12 to its first position allows the piezoelectric to be relaxed so that it will again be able to generate the electric signal upon removal of the tongue.

Figure 9:
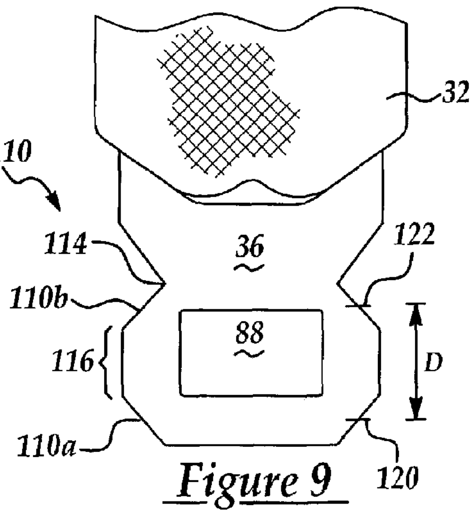
FIG. 9 shows another embodiment of a seat belt tongue having a side surface that includes a flat section extending between two angled surfaces.

Referring to FIG. 9, there is seen an alternative embodiment of the side edge of tongue 36, where a flat section 116 separates angled surfaces 110*a* and 110*b* such that they do not converge to a point. After a plunger has been depressed by sliding along angled surface 110*a*, instead of immediately sliding down surface 110*b* and releasing the plunger (as is the case in FIG. 8), the plunger first slides along flat section 116. Therefore, the distance D between piezoelectric activation point 120 and piezoelectric reset point 122 has been increased. As with the flat surface 100 of FIG. 4, this flat section 116 allows the piezoelectric to be activated well before the microswitch 16 changes states. The resulting larger distance D allows for greater play in the microswitch 16 so as to minimize the possibility of the piezoelectric 14 and switch 16 activating simultaneously or out of sequence. Accordingly, less expensive microswitches can be successfully utilized in order to determine the state of the seat belt assembly.

As discussed above, regardless of which embodiment is used to activate the piezoelectric element 14, a mechanical output causes that element to produce an electrical signal that is then fed to transmitter 18. In the case of the spark gap of FIG. 5, the electrical signal has a sufficient voltage to arc across gap 60, thereby emitting a short pulse of broad bandwidth radio frequency. This emission is then detected by an antenna located elsewhere in the vehicle. Sampling at several frequencies could confirm the broadband emission, and thus the activation of the mechanical sensing member. A two-state electronic device for tracking the current state of the seat belt could be connected to the antenna, and reset when the ignition is turned off. In this regard, the receiver 20 can be designed to continuously monitor for transmitted signals regardless of the state of the ignition, or could be controlled by the vehicle ignition system so that it only is active when the vehicle is operated.

In the case of the embodiment of FIG. 6, the electrical signal from the piezoelectric element causes the tuned LC circuit to emit a wireless signal at a particular frequency, thus allowing the electronic control unit to identify which seat belt assembly is being latched or unlatched. The electrical signal is fed through the LC circuit such that it emits radio waves at its resonant frequency. Adjusting the values of either the capacitor or the inductor allows the resonant frequency to be adjusted to a frequency characteristic of that circuit, and hence that seat belt assembly. Though a simple antenna could still be used to receive the wireless signal, a more complex electronic control unit 22 would be needed to amplify, discriminate, and perform whatever functions were necessary to determine from which seat belt the signal originated.

The embodiment of FIG. 7, on the other hand, utilizes a rectifying circuit, an LC circuit, and an encoding circuit to impart encoded information onto the wireless signal. In this embodiment, the rectifier 70 and LC circuit 72 convert the high voltage, low amperage spike created by the piezoelectric element to a low voltage power signal compatible with current integrated circuit electronics. In this scenario, the LC circuit is used to regulate the power supplied to encoding circuit 74 and does not impart any information onto the wireless signal. Moreover, if each seat belt assembly utilizes an encoding circuit similar to that seen in FIG. 7, all of the wireless signals could be transmitted on the same frequency, the only difference being the encoded information. The encoding circuit can be a traditional radio frequency transmitter circuit that transmits an encoded radio frequency message. Accordingly, the antenna receiving that signal could be coupled to a traditional radio frequency receiver mounted in the passenger compartment. By using an encoded signal, various pieces of information, such as a vehicle identifier (VIN), a seat identifier, the particular state of the seat belt assembly (latched or unlatched), and other information could be included in the wireless signal. Moreover, encoding reduces the possibility of interference from other sources. The receiver 20 could either be an independent circuit, that is a separate, dedicated circuit, or could utilize unused channels of other receiver devices, thereby saving costs by sharing existing equipment.

The status monitoring circuits can utilize a power source other than the piezoelectric element 14. For example, one or more batteries could be incorporated within the buckle to supply the transmitter with energy. In order to save energy and thereby decrease the frequency with which the battery must be replaced, a momentary switch can be included so that the battery only supplies power during latching or unlatching of the tongue.

It will therefore be apparent that there has been provided in accordance with the present invention a seat belt status monitoring system which achieves the aims and advantages specified herein. It will, of course, be understood that the foregoing description is of preferred exemplary embodiments of the invention and that the invention is not limited to the specific embodiments shown. Various changes and modifications will become apparent to those skilled in the art. For example, the piezoelectric element can be designed to be mechanically acted upon in compression during latching of the tongue into the buckle and tension during unlatching. This would provide a reverse polarity which could be detected and used to indicate the latch condition without the need for a microswitch or other separate sensor. Alternatively, a second piezoelectric device could be included with one piezoelectric used to detect insertion and the other to detect removal of the tongue, thereby again obviating the need for the microswitch to determine the latch condition. All such changes and modifications are intended to be within the scope of the present invention.

What is claimed is:

1. A seat belt status monitor for use with a vehicle seat belt assembly having a seat belt buckle and tongue that can be inserted and removed from the seat belt buckle, the seat belt status monitor comprising:

a mechanical sensing member located within the seat belt buckle, said mechanical sensing member being movable within the seat belt buckle during insertion of the tongue, wherein said mechanical sensing member moves from a first position to a second position during initial insertion of the tongue into the seat belt buckle and further moves from said second position back to said first position during continued insertion of the tongue into the seat belt buckle;

a piezoelectric element positioned relative to said mechanical sensing member such that movement of said mechanical sensing member between said first and second positions imparts a mechanical force onto said piezoelectric element, wherein said piezoelectric element produces an electrical signal in response to the mechanical force; and a transmitter located within the buckle and connected to said piezoelectric element, wherein said transmitter emits a wireless signal in response to and powered by said electrical signal.

2. The seat belt status monitor of claim 1, wherein said transmitter comprises a spark gap sized such that the electrical signal is capable of producing a spark across said spark gap, whereby the sparking across said spark gap produces the wireless signal.

3. The seat belt status monitor of claim 2, wherein said wireless signal is a broad bandwidth radio frequency signal.

4. The seat belt status monitor of claim 1, wherein said transmitter comprises a tuned circuit capable of generating the wireless signal at one or more frequencies within a predetermined frequency range.

5. The seat belt status monitor of claim 4, wherein said tuned circuit includes an inductor and a capacitor.

6. The seat belt status monitor of claim 4, wherein said tuned circuit generates the wireless signal at a specific frequency associated with the seat belt status monitor to uniquely identify the seat belt status monitor from wireless signals sent by other seat belt status monitors.

7. The seat belt status monitor of claim 1, further comprising an encoding circuit capable of providing the wireless signal with encoded status information.

8. The seat belt status monitor of claim 7, further comprising a rectifier circuit connected between said piezoelectric element and said encoding circuit to rectify the electrical signal produced by the piezoelectric element.

9. The seat belt status monitor of claim 7, wherein said encoded status information includes data uniquely identifying the seat belt assembly from other seat belt assemblies within the vehicle.

10. The seat belt status monitor of claim 7, wherein said transmitter includes said encoding circuit.

11. The seat belt status monitor of claim 7, further comprising a switch located within the seat belt buckle such that said switch is in a first state when the tongue is latched within the seat belt buckle and is in a second state when the tongue is unlatched from the seat belt buckle, wherein said switch is connected to said encoding circuit and wherein said wireless signal includes encoded information representative of the state of said switch, whereby the wireless signal is indicative of whether the seat belt assembly is in a latched or unlatched state.

12. The seat belt status monitor of claim 1, wherein said mechanical sensing member is movable within the seat belt buckle during insertion and removal of the tongue.

13. The seat belt status monitor of claim 1, wherein the wireless signal provides status information concerning the seat belt assembly.

14. The seat belt status monitor of claim 13, further comprising a switch located within the seat belt buckle such that said switch is in a first state when the tongue is latched within the seat belt buckle and is in a second state when the tongue is unlatched from the seat belt buckle, wherein said switch is connected to said transmitter and wherein said wireless signal is representative of the state of said switch, whereby the wireless signal is indicative of whether the seat belt assembly is in a latched or unlatched state.

15. The seat belt status monitor of claim 1, wherein said mechanical sensing member is positioned within the seat belt buckle such that it engages and is moved by an edge of the tongue during insertion of the tongue into the seat belt buckle.

16. The seat belt status monitor of claim 1, wherein, during removal of the tongue from a latched position within the seat belt buckle, said mechanical sensing member moves reciprocally from said first position to said second position and then back to said first position to thereby activate said piezoelectric element a second time.

17. The seat belt status monitor of claim 1, wherein said mechanical sensing member is located within the seat belt buckle in contact with a retention latch, and wherein said mechanical sensing member moves in response to movement of the retention latch.

18. The seat belt status monitor of claim 1, wherein said mechanical sensing member is a plunger that imparts the mechanical force on said piezoelectric element during insertion of the tongue into the seat belt buckle.

19. The seat belt status monitor of claim 1, wherein said piezoelectric element serves as the sole power source for said seat belt status monitor.

20. A seat belt status monitor for use with a vehicle seat belt assembly having a seat belt buckle and tongue that can be inserted and removed from the seat belt buckle, the seat belt status monitor comprising:

a mechanical sensing member located within the seat belt buckle, said mechanical sensing member being movable within the seat belt buckle during insertion of the tongue;

a piezoelectric element positioned relative to said mechanical sensing member such that movement of said mechanical sensing member imparts a mechanical force onto said piezoelectric element, wherein said piezoelectric element produces an electrical signal in response to the mechanical force; and a transmitter located within the buckle and connected to said piezoelectric element, wherein said transmitter emits a wireless signal in response to and powered by said electrical signal;

wherein said mechanical sensing member is a flexible arm supporting said piezoelectric element, with said flexible arm bending during insertion of the tongue into the seat belt buckle to thereby impart the mechanical force to said piezoelectric element.

21. The seat belt status monitor of claim 20, wherein said piezoelectric element is a flexible coating applied to said flexible arm such that a mechanical strain on said flexible arm causes said flexible coating to produce said electrical signal.

22. A seat belt status monitor for use with a vehicle seat belt assembly having a seat belt buckle and tongue that can be inserted and removed from the seat belt buckle, the seat belt status monitor comprising:

a mechanical sensing member located within the seat belt buckle, said mechanical sensing member being movable within the seat belt buckle during insertion of the tongue;

a piezoelectric element positioned relative to said mechanical sensing member such that movement of said mechanical sensing member imparts a mechanical force onto said piezoelectric element, wherein said piezoelectric element produces an electrical signal in response to the mechanical force;

a transmitter located within the buckle and connected to said piezoelectric element, wherein said transmitter emits a wireless signal in response to and powered by said electrical signal; and a sliding element that contacts a portion of the tongue during insertion of the tongue into said opening, wherein said sliding element includes an actuating member having first and second angled surfaces located relative to said mechanical sensing member such that initial movement of said sliding element in response to insertion of the tongue causes the first angled surface to depress said mechanical sensing member, and subsequent movement of the sliding element in response to further insertion of the tongue causes the second angled surface to release said mechanical sensing member.

23. A vehicle seat belt buckle for use with a seat belt tongue that is insertable and removable from the seat belt buckle, comprising:

a housing having an opening sized to receive the tongue; and a seat belt status monitor located within said housing and having a transmitter, piezoelectric element, and a displaceable component positioned within said housing such that said displaceable component undergoes movement during insertion of the tongue into said opening;

wherein said piezoelectric element is positioned relative to said displaceable component such that movement of said displaceable component imparts a mechanical force onto said piezoelectric element during partial insertion of the tongue into said housing and then removes the mechanical force from said piezoelectric element as the tongue becomes fully inserted into said housing; and wherein, in response to the mechanical force, said piezoelectric element provides an electrical signal that is used to power said transmitter to generate a wireless seat belt status signal.

24. The seat belt buckle of claim 23, wherein said seat belt status monitor includes a mechanical sensing member that imparts the mechanical force onto said piezoelectric element in response to movement of said displaceable component during insertion of the tongue into said opening.

25. The seat belt buckle of claim 24, wherein said displaceable component comprises a sliding element that contacts a portion of the tongue during insertion of the tongue into said opening.

26. The seat belt buckle of claim 23, wherein said displaceable component is a mechanical sensing member that engages and is moved by an edge of the tongue during insertion of the tongue into said opening.

27. A vehicle seat belt buckle for use with a seat belt tongue that is insertable and removable from the seat belt buckle, comprising:

a housing having an opening sized to receive the tongue; and a seat belt status monitor located within said housing and having a transmitter, mechanical sensing member, and a sliding element positioned within said housing such that the tongue engages and moves said sliding element during insertion of the tongue into said opening, with said sliding element providing a mechanical input to said transmitter via said mechanical sensing member as said sliding element moves during insertion of the tongue into said opening;

wherein said sliding element includes an actuating member having first and second angled surfaces located relative to said mechanical sensing member such that initial movement of said sliding element in response to insertion of the tongue causes the first angled surface to depress said mechanical sensing member, and subsequent movement of the sliding element in response to further insertion of the tongue causes the second angled surface to release said mechanical sensing member; and wherein said status monitor is responsive to the mechanical input to generate a wireless seat belt status signal using said transmitter powered by said mechanical input.

28. The seat belt buckle of claim 27, wherein said transmitter includes a piezoelectric element positioned relative to said mechanical sensing member such that movement of said mechanical sensing member imparts a mechanical force onto said piezoelectric element, and wherein in response to the mechanical force said piezoelectric element provides an electrical signal used by said transmitter to generate the wireless seat belt status signal.

29. A seat belt status monitoring system for monitoring the status of a plurality of vehicle seat belt assemblies within a vehicle, said system comprising:

a plurality of status monitors, each of which is associated with a different one of the vehicle seat belt assemblies, each of said status monitors including a power source, a mechanical sensing member, a switch, and a transmitter connected to said switch and said power source, wherein each of said mechanical sensing members is mechanically connected to its associated power source and is movable such that said mechanical sensing member engages said power source and causes said power source to supply operating power to its associated transmitter during latching and unlatching of its associated seat belt assembly, each said switch being positioned to detect the latch condition of its associated seat belt assembly such that said switch is in a first state when the seat belt assembly is in a latched condition and is in a second state when the seat belt assembly is in an unlatched condition, and wherein each of said transmitters is operable in response to the state of said switch to utilize the operating power to emit a wireless signal identifying the latch condition of its associated seat belt assembly and uniquely identifying its associated seat belt assembly from the one or more other seat belt assemblies; and a receiver capable of detecting the wireless signal and determining which of the seat belt assemblies is associated with the received wireless signal.

30. The seat belt status monitoring system of claim 29, wherein each transmitter emits a wireless signal at a different primary frequency than the one or more other transmitters, whereby each wireless signal is uniquely identified by its frequency.

31. The seat belt status monitoring system of claim 29, wherein each of said status monitors includes an encoding circuit operable to encode status information into the wireless circuit.

32. The seat belt status monitoring system of claim 31, wherein each of said switches is connected to its associated encoding circuit to enabling encoding of the latch condition of its associated seat belt assembly.

33. The seat belt status monitoring system of claim 29, further comprising an operator signaling device connected to said receiver, wherein said receiver is operable to send to said signaling device a status signal relating to the status of the seat belt assembly associated with the received wireless signal, and wherein said signaling device is responsive to the status signal to provide an indication of the status of the associated seat belt assembly.

34. The seat belt status monitoring system of claim 29, wherein each said mechanical sensing member and each said switch are positioned within their associated seat belt assembly such that, during latching of the seat belt assembly, said mechanical sensing member activates said power source to supply the operating power prior to said switching changing to said first state.

35. The seat belt status monitoring system of claim 33, wherein the receiver is operable to provide said signaling device with a status signal that identifies the latch condition of the associated seat belt assembly.

36. The seat belt status monitoring system of claim 35, wherein said operator signaling device provides a visual display indicating the latch condition of each of seat belt assemblies.

37. The seat belt status monitoring system of claim 29, wherein each of said status monitors includes a separate power source that comprises a piezoelectric element positioned relative to said mechanical sensing member such that movement of said mechanical sensing member imparts a mechanical force onto said piezoelectric element, thereby producing electricity on the piezoelectric element, and wherein said piezoelectric element is connected to said transmitter to provide the electricity to said transmitter for generation of the wireless signal.

38. The seat belt status monitoring system of claim 37, wherein, during latching of the seat belt assembly, said mechanical sensing member moves from a first position to a second position and then back to said first position such that said piezoelectric element is reset once the seat belt assembly is fully latched.

39. The seat belt status monitoring system of claim 38, wherein, during unlatching of the seat belt assembly, said mechanical sensing member moves from said first position to said second position and then back to said first position such that said piezoelectric element is reset again once the seat belt assembly is fully unlatched.

* * * * *